United States Patent [19]

Dimas, Jr. et al.

[11] 4,324,430
[45] Apr. 13, 1982

[54] INFANT CARRIER PARTICULARLY FOR GROCERY STORE SHOPPING CARTS

[76] Inventors: Herman Dimas, Jr.; Janice E. Dimas, both of Box 694, Guernsey, Wyo. 82214

[21] Appl. No.: 141,646

[22] Filed: Apr. 18, 1980

[51] Int. Cl.³ ............................................. A47D 1/10
[52] U.S. Cl. ............................. 297/250; 280/33.99 B; 224/159
[58] Field of Search ........................ 297/250, 254, 4; 280/33.99 B, 33.99 A, 33.99 R, 47.38, 47.4; 224/159

[56] References Cited

U.S. PATENT DOCUMENTS

| | | | |
|---|---|---|---|
| 576,292 | 2/1897 | Vanderburgh | 224/159 |
| 1,196,003 | 8/1916 | Lippincott | 297/4 X |
| 4,108,489 | 8/1978 | Salzman | 297/250 X |
| 4,204,695 | 5/1980 | Salzman | 297/250 X |

FOREIGN PATENT DOCUMENTS

| | | | |
|---|---|---|---|
| 322851 | 8/1957 | Switzerland | 280/33.99 B |
| 1519793 | 8/1978 | United Kingdom | 297/250 |

*Primary Examiner*—Peter P. Nerbun
*Attorney, Agent, or Firm*—D. Paul Weaver

[57] ABSTRACT

A simplified, lightweight and very compact chair-like carrier enables placing an infant securely and comfortably in the seat structure of a shopping cart. Straps attached to the carrier anchor it to both the back and seat portions of the shopping cart seat structure while other attached straps on the carrier hold the infant against toppling forwardly or laterally. A further detachable and adjustable strap allows supporting the infant carrier on the body of an adult for transporting.

2 Claims, 6 Drawing Figures

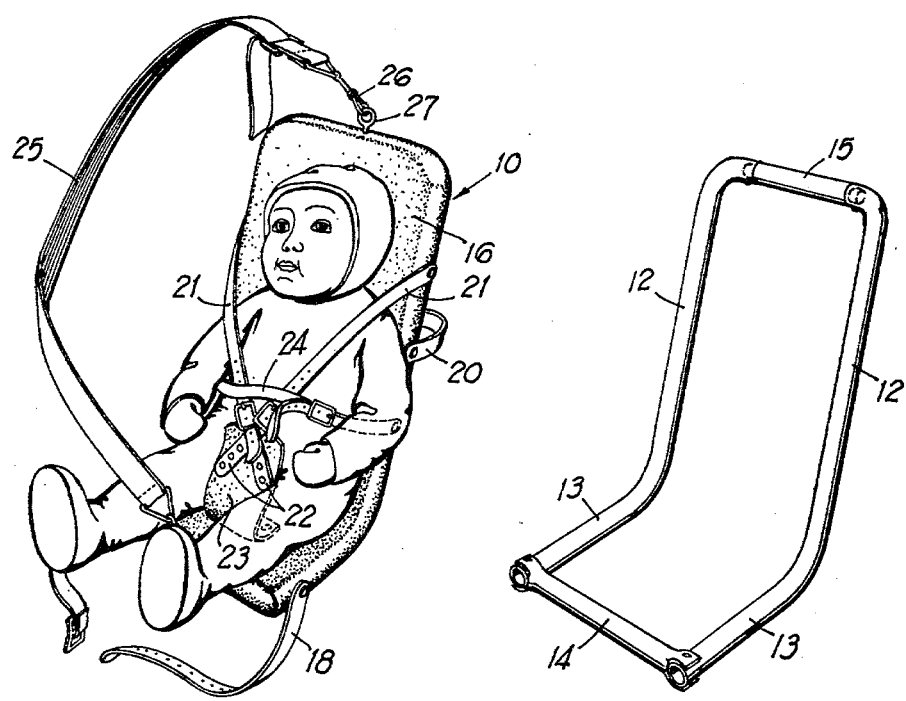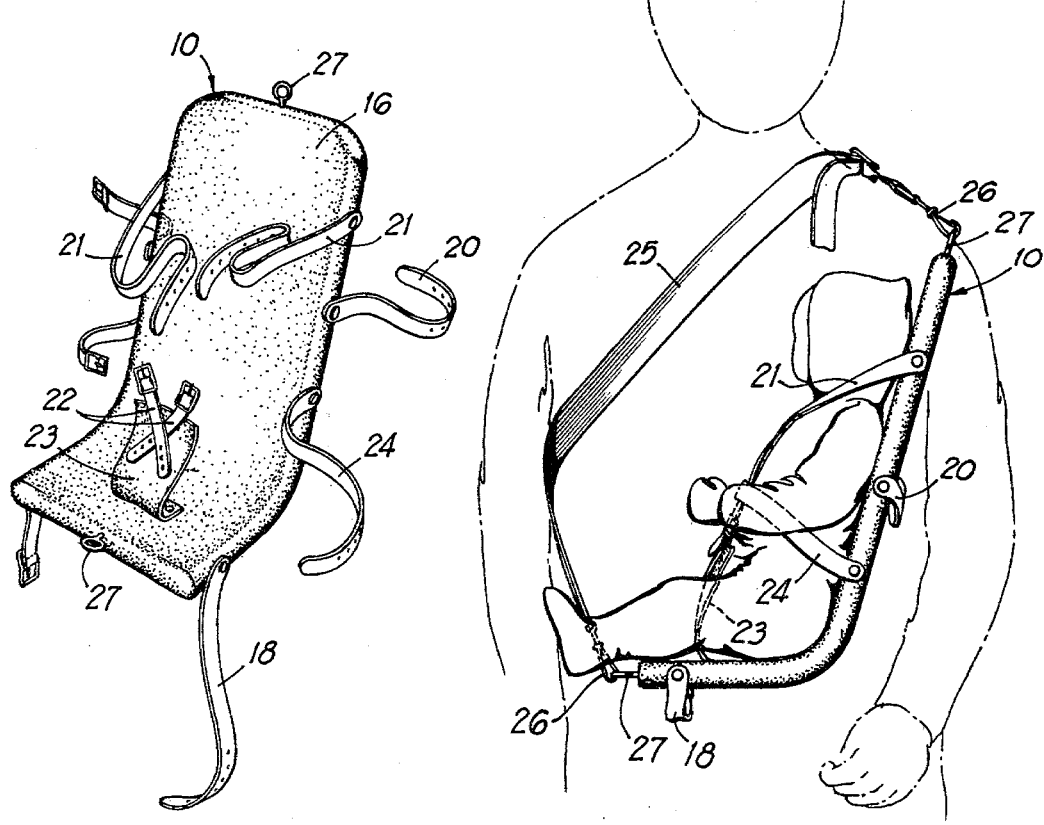

INFANT CARRIER PARTICULARLY FOR GROCERY STORE SHOPPING CARTS

BACKGROUND OF THE INVENTION

Infant carriers of many kinds have been known since antiquity, ranging from the American indian papoose to present day sophisticated and sometimes complex portable infant car seats and carriers. These prior art devices usually are designed for very specific purposes such as offering maximum protection to an infant in an automobile, or propping up an infant on a table or on the floor to facilitate its feeding. In spite of the variety of such devices presently on the market, there is no known support or carrier for infants suitable for placement in the folding seat structures of grocery store shopping carts. Accordingly, a mother while shopping must either leave the infant behind or attempt to carry it in an awkward and inconvenient manner in her arms or with the assistance of a carrier which cannot safely be placed in or attached to the shopping cart.

The simple objective of this invention is to entirely alleviate this problem through provision of an infant carrier which is totally compatible with and easily attachable to the customary folding seat structure of any shopping cart. The carrier is also equipped with means enabling its attachment to the body of an adult in a comfortable and convenient manner for transport.

The carrier is characterized by extreme simplicity of construction, minimized weight, low cost of manufacturing, compactness and convenience of use. It fits snugly into the seat structure of a shopping cart and is equipped with adjustable straps for anchoring the carrier to both the back and seat portions of the shopping cart seat. Other straps are provided on the carrier to secure the infant to the carrier and prevent toppling over in both the fore and aft and lateral planes.

Other features and advantages of the invention will become apparent during the course of the following description.

BRIEF DESCRIPTION OF THE DRAWINGS

FIG. 1 is a perspective view of an infant carrier according to the present invention.

FIG. 2 is a perspective view showing the simplified frame of the carrier.

FIG. 3 is a further perspective view of the carrier without the infant and without the removable transport strap.

FIG. 4 is a side elevational view of the carrier in a transport mode.

DETAILED DESCRIPTION

Figure 5:
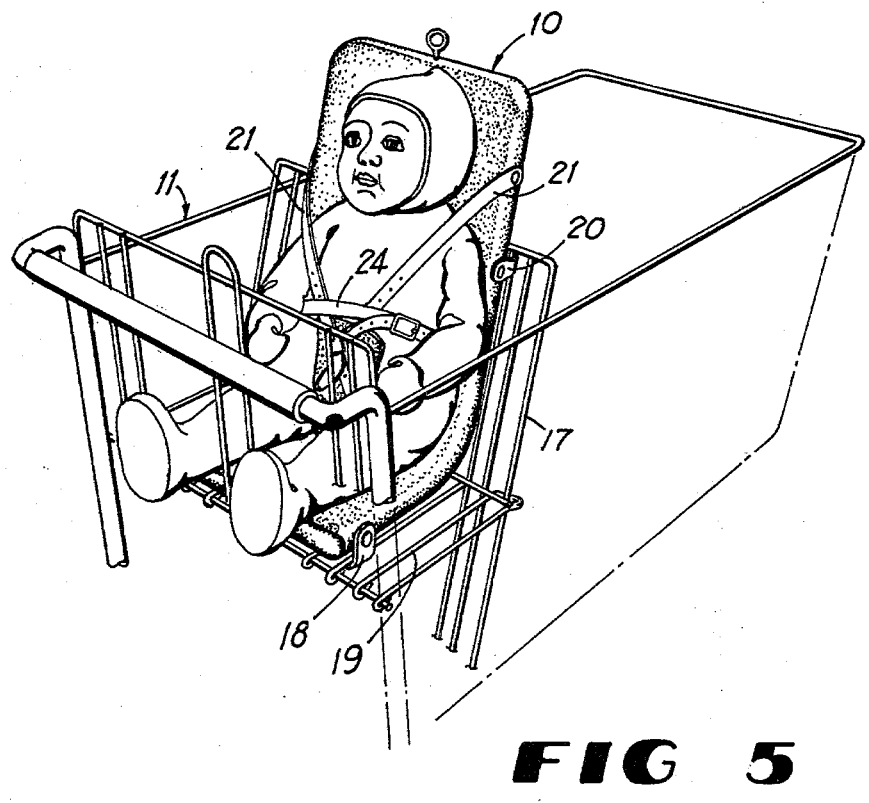
FIG. 5 is a perspective view of the carrier being used with a shopping cart.

Referring to the drawings in detail wherein like numerals designate like parts, an infant carrier or support 10, particularly adapted for use in a standard grocery store shopping cart 11, comprises a simplified lightweight slender frame including two generally upright parallel back bars 12 having integral forwardly extending shorter seat bars 13 which are horizontally disposed during use. The forward ends of the seat bars 13 are rigidly connected by a preferably detachable front bar 14 extending at right angles thereto, and the tops of the back bars 12 are connected by a crossbar 15 which may be detachable to facilitate packaging of the device. The frame can be formed of metal tubing and when assembled is quite rigid and strong. It is chair-like in configuration with a high back comfortably inclined from the vertical and no legs or depending rigid projections are formed on the seat portion of the frame.

The assembled frame can be covered in a conventional manner with any suitable tough fabric 16, plastic sheeting or the like to form a taut comfortable infant support surface and to facilitate washing the carrier. With the fabric covering 16 attached to the frame as shown, the unified structure is very slender and compact without projections and its shallow comparatively short seat portion is readily insertable into the seat structure of the shopping cart 11 equipped with the customary folding seat 17. The back portion of the infant carrier parallels and rests against the back of the shopping cart seat, and the level seat portion of the carrier rests solidly on the seat portion of the shopping cart seat, as best illustrated in FIG. 5.

Figure 6:
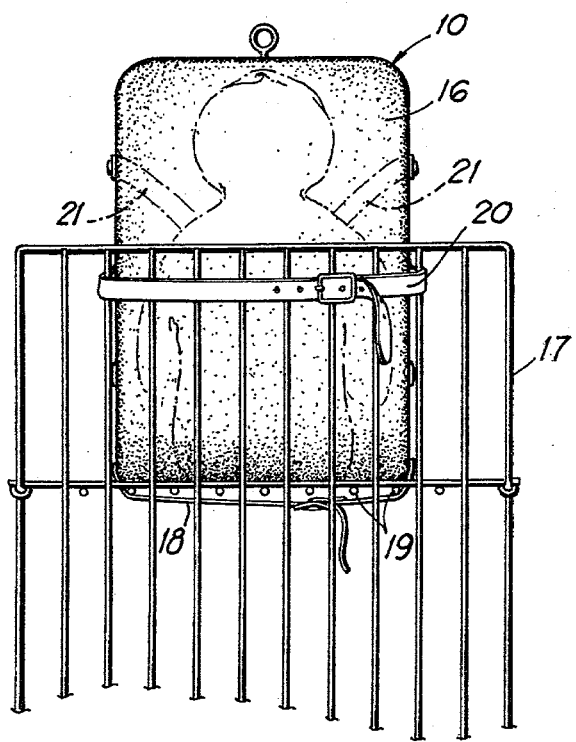
FIG. 6 is a rear elevation of the carrier shown in FIG. 5.

A first adjustable strap 18 is attached to the infant carrier near the forward end of its seat portion to facilitate securing the seat portion of the infant carrier to the shopping cart seat as shown in FIG. 6 by passing the strap 18 between and below the usual wire rods 19 of the cart seat. A second adjustable strap 20 midway up the back of the infant carrier allows convenient securing of the back to the back portion of the cart seat as clearly shown in FIG. 6. When so attached to the cart seat, the infant carrier 10 is stabilized and held against displacement in all directions.

Two more adjustable straps 21 are attached to opposite sides of the carrier back portion above strap 20 and are adapted to extend downwardly over the infant's torso in a crossed mode as best shown in FIG. 1. The buckle portions 22 of straps 21 are secured directly or by a crotch flap 23 to the fabric 16 at the seat portion of the carrier 10. Another and final adjustable strap 24 provided on the carrier 10 and attached thereto at a low elevation below the strap 20 encircles the infant's torso as best shown in FIG. 4. The straps 21 and 24, therefore, stabilize the infant in all directions including fore and aft, upwardly with relation to the carrier and laterally. The infant is held in a very secure, safe and comfortable manner in a shopping cart.

The carrier 10 is preferably provided with an adjustable and detachable shoulder sling strap 25 to allow transporting the infant carrier on the body with convenience and comfort. Snap fasteners 26 on the ends of the sling strap 25 can be coupled with eyes 27 on the carrier 10 at the top of its back portion and at the forward end of its seat portion. With the strap 25 slung over one shoulder, the carrier 10 can assume a securely supported position at the front of the body as best shown in FIG. 4 with the infant in a natural sitting position.

The advantages and conveniences of the carrier or support, as well as its economies, should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An infant carrier for the dual purpose of supporting an infant on the body and for supporting the infant in a safe sitting position in a shopping cart seat, said dual purpose carrier comprising a generally L-shaped substantially rigid support frame having the profile of a chair without legs and defining a comparatively short seat portion and a longer rising back portion, taut sheet material attached to said frame and providing support surfaces for an infant held in the carrier, a crotch flap attached to said sheet material at the seat portion of the carrier, first straps attached to opposite sides of the back portion of the carrier and adapted to be extended in crossed relationship forwardly and over the shoulders and chest of an infant seated in the carrier and adapted for connection releasably with said crotch flap, a second strap including portions attached to opposite sides of said back portion of the carrier below the attachment points of the first straps and adapted to be releasably secured across the front of the torso of an infant seated in the carrier, whereby the infant is securely held against fore and aft movement, lateral movement and downward sliding movement in the carrier, a third strap including portions attached to opposite sides of the back portion of the carrier at an elevation between the first straps and second strap, the third strap adapted to be releasably fastened to a back portion of the shopping cart seat within which the infant carrier with the infant seated thereon can be bodily placed and removed, and a fourth strap including portions attached to opposite sides of the seat portion of the carrier and adapted to be releasably secured to an underlying seat portion of the shopping cart seat, whereby the back and seat portions of the carrier are firmly anchored to the corresponding portions of the shopping cart seat, and removable sling means attached to the carrier to enable supporting it with an infant seated therein on the body.

2. An infant carrier as defined in claim 1, and said removable sling means comprising a length adjustable sling strap having quick removable snap hooks on opposite ends thereof, and coacting fixed anchor elements on the forward end of the seat portion of the carrier and the top of its back portion.

* * * * *